Patented Dec. 16, 1924.

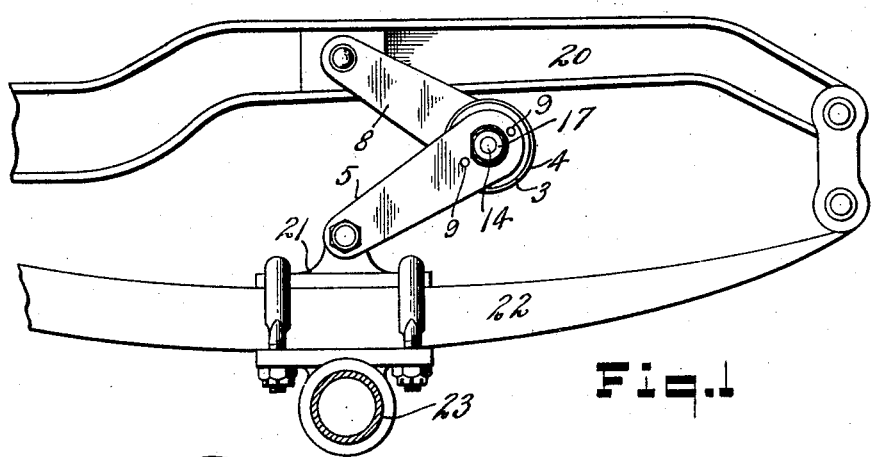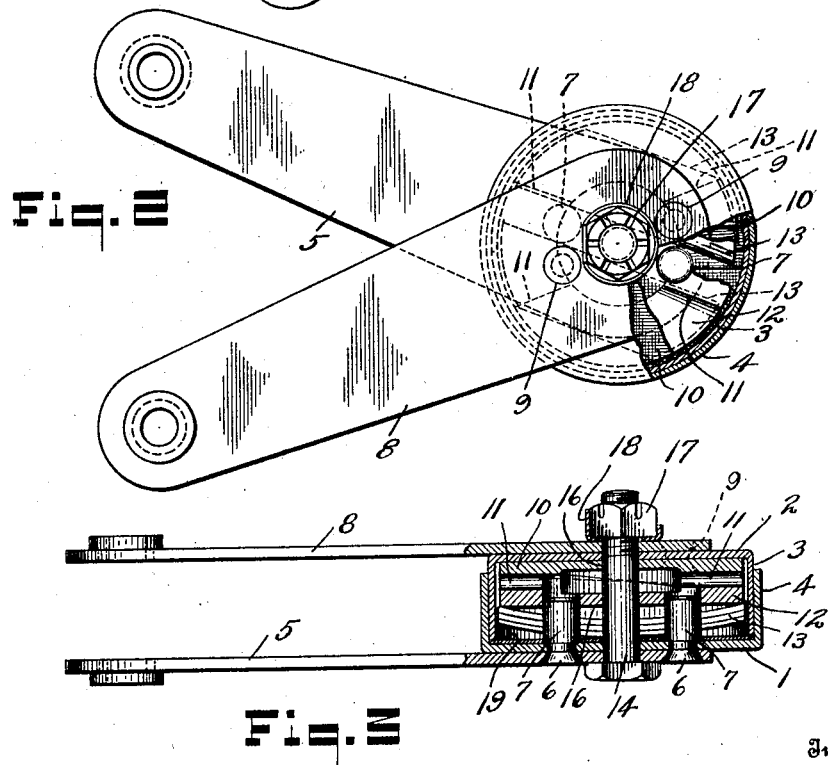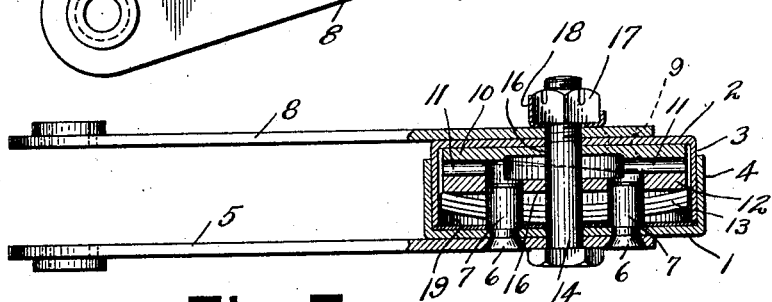

UNITED STATES PATENT OFFICE.

ERNEST C. AUSTIN, OF WAYNE, MICHIGAN.

SHOCK ABSORBER.

Application filed February 27, 1922. Serial No. 539,460.

*To all whom it may concern:*

Be it known that I, ERNEST C. AUSTIN, a citizen of the United States of America, residing at Wayne, in the county of Wayne and State of Michigan, have invented certain new and useful Improvements in Shock Absorbers, of which the following is a specification, reference being had therein to the accompanying drawings.

This invention relates to devices for use on motor vehicles for absorbing or deadening the shocks and jars incident to the rebound of the load carrying springs of the vehicle, and its object is to permit a free normal deflection of the springs and to retard and check the rebound or sudden recovery of the springs under abnormal deflection. It is also an object to provide a simple construction which is cheap to manufacture, may be readily applied to motor vehicles as commonly constructed, and wherein ample provision is made for lubricating the parts to prevent undue wear and noise. A further object is to construct such a device as to exclude dust and dirt from the working parts and provide other new and useful features, all as hereinafter more fully set forth.

With the above and other ends in view, the invention consists in the matters hereinafter set forth and more particularly pointed out in the appended claims, reference being had to the accompanying drawings in which—

Fig. 1 is a side elevation of a device illustrative of the invention and showing the same as applied in use to a motor vehicle chassis;

Fig. 2 is a side elevation of the device detached and with portions broken away and in section to more clearly disclose the construction;

Fig. 3 is a horizontal section through the same;

Figure 5:
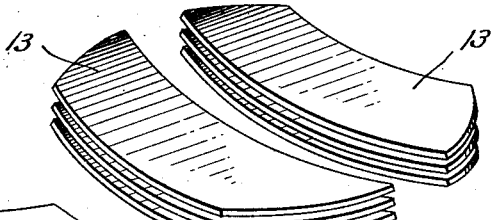

Fig. 5 a similar view of spring plates; and

Figure 6:
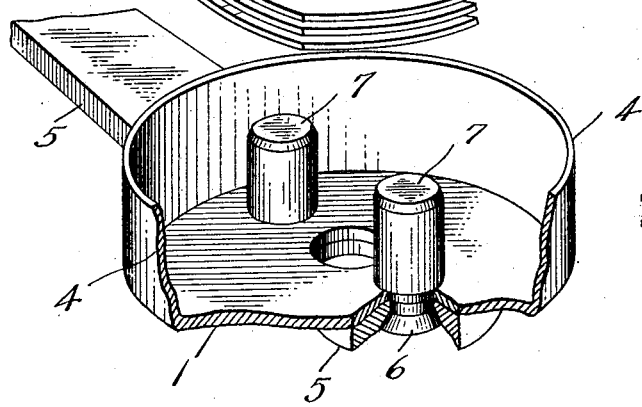

Fig. 6 a perspective view of one casing member with a side thereof broken away to show the construction.

Shock absorbers or devices for preventing the rebound of vehicle springs under deflection caused by shocks and jolts incident to road conditions and other causes, usually operate to not only retard rebound of the springs but also to retard the deflection of the springs under load, thus modifying and lessening the cushioning effect of the springs so that they do not function properly to absorb vibration, jolts and jars incident to the travel of the vehicle over rough roads or obstacles. The present device is designed to permit free deflection or compression of the load carrying spring and a free return to normal position, so that the device does not retard or modify such deflection or interfere with the normal action of the spring or springs, thus permitting the spring to absorb the small shocks and vibration under normal road conditions. The device is however arranged to come into action and check the rebound of the load carrying spring or springs whenever conditions produce abnormal deflection thereof, gradually checking or retarding such rebound and absorbing the resultant shock.

As illustrative of a construction designed to secure the desired action, a circular casing is formed in two telescoping parts 1 and 2, the rim 3 of the part 2 fitting snugly within the rim 4 of the part 1 to turn freely therein and each casing part is provided with an arm, the part 1 being provided with the arm 5 which is rigidly secured to its casing by rivets 6, the inner ends of which are in the form of studs 7 projecting into the casing, and the part 2 being provided with the rigid arm 8 secured to its casing part by rivets 9 passing through openings in the arm and circular side of the casing and also through openings in a cam disk 10 within the casing. These rivets 9 therefore not only rigidly secure the arm 8 to the outer side of the casing part 2 but also rigidly secure the cam disk 10 within the casing flat against the bottom of the casing member 2. The inner or free side of this cam disk 10 is formed with two peripheral inclines 11 arranged in diametrically opposed relation on the disk, and a like cam disk 12 is loosely mounted in the casing, being provided with inclines or cam surfaces 11, the same as the disk 10, and also provided with openings to receive the studs 7 which are adapted to guide said disk 12 and prevent it from turning relative to its casing member 1. These cam disks 10 and 12 are arranged with their faces which have the inclines, in opposed relation so that as one casing member and consequently its cam disk is turned relatively to the other casing member and its cam disk, the inclines will be brought into frictional contact, the inclines on one disk riding up the inclines on the other disk, and to hold the movable disk 12 in firm frictional contact with the other disk during such relative turning movement, two sets of spring leaves 13 are inserted in the casing part 1 between its bottom and the adjacent flat side of the disk 12. The spring leaves of each series are in superposed relation and there is a series at each side of the studs 7 so that said studs form spacers between the two series and cause them to move with the casing member 1 upon rotation of said member, at the same time permitting free yielding movement of the leaves which are curved in the direction of their length with their concave side toward the disk 12 and the ends of the leaves of the two series in contact with said disk adjacent its periphery.

The circular or cup-shaped casing members 1 and 2 are held against separation but free to turn, one within the other, by an axial bolt 14 passing through axial openings in the casings and like openings 16 in the cam disks 10 and 12, also through openings in the arms 5 and 8 which are secured upon the outer side of the casing members. This bolt has a head at one end and is screw-threaded at its opposite end to receive a nut 17 which is held in adjusted position upon the bolt by any suitable locking means, such as a lock washer 18. This axial bolt 14 therefore holds the two parts of the casing in telescoped relation against being spread apart by the action of the springs 13, with the edge of the flange 3 of the member 2 adjacent the bottom wall of the member 1, and, if found desirable, a suitable packing disk or ring 19 may be placed in the bottom of the casing part 1 to be engaged by said edge portion of the flange 3 and make an oil tight joint so that the casing formed by the two telescoping parts 1 and 2 may be packed with a suitable lubricant to prevent wear of the cam surfaces.

As illustrated in Fig. 1, the device may be applied to a motor vehicle by pivotally attaching the free end of one of the arms 5 and 8 to the chassis frame 20 and the free end of the other arm to a clip 21 which holds the main supporting spring 22 in place upon the vehicle axle 23.

Obviously, the device may be attached in any manner applicable to the particular vehicle construction and its spring suspension, so that the arms will be swung toward and from each other and the casing parts rotated thereby, upon flexure and retraction of the load carrying spring of the vehicle chassis.

Figure 4:
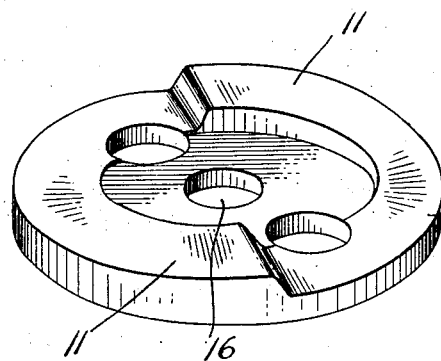
Fig. 4 is a perspective view of a cam disk detached.

As shown in Fig. 4 of the drawings, it will be noted that the inclines 11 do not each extend throughout the full half of the circle of the disk but each incline tapers into the flat surface of the disk before reaching the high end of the other incline, and, therefore, each disk is flat or devoid of any rise throughout, approximately forty-five degrees of its turning movement. These disks are, therefore, not spread apart during a portion of their rotary movement, one upon the other and no binding action results, the disks turning with comparative freedom, one upon the other through this range of approximately forty-five degrees. A further relative rotation of the disks, will, however, bring their inclines or cam surfaces into contact and a gradual spreading apart of the disks is effected as the inclines on one disk ride up the inclines on the other. As the casing members containing the disks are held against spreading or moving telescopically by the axial bolt 14, the spring leaves 13 will be deflected or straightened by this spreading apart of the disks, and a strong frictional resistance to the turning movement of the casing members will be provided by the action of the leaf springs against the disk.

With this arrangement, when the flat portion of one disk is in contact with the like portion of the other, the spring leaves 13 are under little or no tension and therefore the disks and casing members may turn with little or no resistance through an angle of approximately forty-five degrees. This allows for the normal deflection under normal condition of the load spring 22 without resisting such deflection or its recovery and the full benefit of the load spring and its flexibility is secured. When a deep hole or obstruction is encountered in the road which causes an abnormal deflection of the load spring and a consequently heavy rebound, this rebound or reflex action of the spring is checked effectually by the riding of the incline on one disk up the incline on the other and the consequent added frictional resistance to turning movement afforded by the spring leaves, and the greater the reflex action, the greater will be the resistance.

With this device applied, the load spring normally acts substantially as though no retarding or shock absorbing device was in place, but any reflex action beyond the normal will be checked and without checking or stiffening of the deflection of the load spring. The full effectiveness of the load spring is therefore always available to dissipate shocks and vibration, but extreme reflex action of the spring is checked.

By reason of the construction and arrangement of casing, those parts which are subject to disintegration and wear, are tightly encased against dust and dirt, and are packed in lubricant, the lubricant contained in the casing being forced from and between the cam surfaces by the movement of the cam disk 12 back and forth, toward and from the opposed disk 2, the lubricant being squeezed from between the disks as they approach each other and forced to flow behind the movable disk, and when the disks move apart, the lubricant is caused to flow from behind the disk into the space between the disks, thus keeping the parts thoroughly lubricated at all times without the necessity for constant attention.

The present construction and arrangement of parts, particularly lends itself to manufacture of the parts by stamping operations, the casing members, arms, cam disks and springs being all metal stampings, and therefore the device may be constructed at a minimum cost with a maximum of strength and lightness in weight.

Obviously, changes may be made within the scope of the appended claims, in the form, construction or arrangement of parts without departing from the spirit of the invention and I do not, therefore, limit myself to the particular construction shown.

Having thus fully described my invention, what I claim is:—

1. A shock absorber for vehicles comprising telescopic casing members together forming a tight casing and rotatable, one within the other, an operating arm carried by each casing member and extending laterally therefrom, a pair of disks in the casing with one disk secured within one casing member to turn therewith and the other disk operatively connected to the other casing member to turn therewith and to move relatively thereto toward and from the other disk, said disks being formed with opposed inclined surfaces adapted to be brought into contact by a relative rotation of the disks and to operate to separate the disks, yielding means within the casing to engage the disk which is movable relative to its casing member, said means being interposed between said disk and the bottom of the casing member to which it is operatively connected to yieldingly resist the movement of said disk away from the other disk upon relative turning movement of the disks, and a single bolt passing axially through said casing members and disks for operatively connecting the casing members to prevent their separation and permitting relative turning movement thereof.

2. A shock absorber comprising a casing formed of a pair of cup-shaped telescoping members, an operating arm carried by each member for turning the casing members relatively, a disk secured within one of the casing members and provided with side surfaces which are inclined to the plane of the disk and extended concentrically with the axis of the disk, studs in the other casing member, a second disk carried by and movable upon said studs toward and from the first mentioned disk, said second disk being also formed with side face portions inclined to the plane of the disk and extended concentric with the axis thereof to engage the inclines on the first mentioned disk when said disks are turned, yieldable means within the casing member having the studs and arranged between the bottom of said casing member and the said disk carried by said studs for yieldingly resisting the movement of said disk away from the first mentioned disk, said yieldable means comprising a plurality of superposed separate dished spring plates, and an axial bolt passing through the casing members and disks to permit a relative rotation thereof and prevent their separation.

3. A shock absorber comprising cup-shaped casing members formed of sheet metal with an axial opening in the bottom of each cup and the open end of one cup telescoped within the other cup to form a tight casing, an arm secured to each member for turning the same, a bolt passing through the axial openings in the casing members for preventing the separation of the casing members, opposed disks in the casing formed with axial openings through which said bolt extends, one of said disks being formed with openings positioned laterally of its axial opening and said disks having cam surfaces on their adjacent faces, the disk having the axial opening only being secured within one of the casing members to turn therewith, studs carried by the other casing member and engaging the laterally positioned openings provided in one of the disks to cause said disk to turn with the casing member and permit a movement of the disk toward and from the disk which is fixed within the other casing member, and a plurality of superposed spring plates curved in the direction of their length transversely of the casing and interposed between the disk carried by said studs and the bottom of the casing member at each side of said studs.

In testimony whereof I affix my signature in presence of two witnesses.

ERNEST C. AUSTIN.

Witnesses:
 LEWIS E. FLANDERS,
 KARL H. BUTLER.